Nov. 14, 1967    R. V. SARA    3,352,951
METHOD FOR INDUCTION SINTERING REFRACTORY CARBIDE ARTICLES
Filed Feb. 5, 1965

INVENTOR.
RAYMOND V. SARA
BY
ATTORNEY

United States Patent Office 3,352,951
Patented Nov. 14, 1967

3,352,951
METHOD FOR INDUCTION SINTERING REFRACTORY CARBIDE ARTICLES
Raymond V. Sara, North Olmsted, Ohio, assignor to Union Carbide Corporation, a corporation of New York
Filed Feb. 5, 1965, Ser. No. 430,567
9 Claims. (Cl. 264—25)

ABSTRACT OF THE DISCLOSURE

Sintering a refractory carbide article with induction heating means which includes encapsulating the article in a capsule composed of tantalum carbide or a combination of tantalum carbide and hafnium carbide and heating the capsule and article to a temperature just below the melting point of the article.

---

Figure 1:
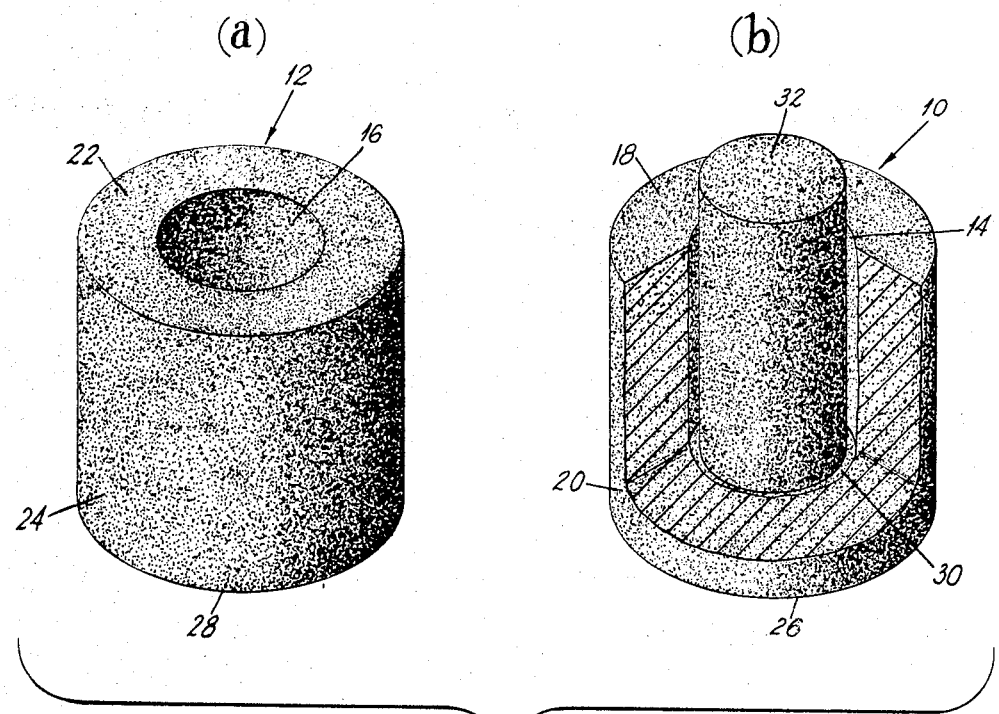

This invention relates to a method of forming refractory carbide articles and more particularly to a method of forming high density hafnium carbide articles.

Certain metal carbides are among the most refractory materials which have thus far been discovered. Special attention is directed to hafnium carbide since it has one of the highest melting points of all known metal carbide compounds.

Fabricating hafnium carbide into dense, useful shapes requires special sintering techniques. Generally, two methods are employed. In the first method, hafnium carbide powder is reduced to small micron size particles, mixed with a temporary binder, formed into the desired shape and then sintered at a relatively low temperature. However, when hafnium carbide is reduced to a fine particle size it is extremely sensitive to oxidation. As a result, objects fabricated by this method contain a substantial amount of oxide impurity which reduces their usefulness. The second method which is often used to form hafnium carbide into desirable shapes involves cold pressing large particles and/or agglomerates of hafnium carbide followed by sintering at high temperatures.

Two systems are presently in use for achieving the high temperatures which are required to effectively sinter hafnium carbide in the second method set forth above. One system employs a graphite or carbon resistance furnace to generate the required temperatures. This method is hindered by the formation of a eutectic between hafnium carbide and the graphite at a temperature of 3150° C. Thus, the sintering temperature must be below this temperature level, thereby limiting the quality of the hafnium carbide product. In the second system, induction self-heating of the hafnium carbide shape is employed. Unfortunately, this method causes peripheral melting due to a "skin effect" heating phenomenon. As a result, the hafnium carbide article does not possess a uniform density and is therefore subject to certain inherent structural defects.

It is the principal object of this invention, therefore, to provide a method whereby refractory carbide articles having a high density and quality are produced.

It is a more specific object of this invention to provide a method for producing a shaped hafnium carbide article having a high quality and density.

It is a further object of this invention to provide a method for forming hanium carbide articles wherein extremely high sintering temperatures may be employed.

Other objects and advantages of this invention will become apparent from the following description, taken in conjunction with the following drawing wherein FIGURE 1 is an illustration of a disassembled capsule which may be suitably employed in the method of the invention.

Broadly, the objects of the invention are accomplished by a method comprising preforming a refractory carbide material into a desired shape, encapsulating the formed refractory material in a capsule which is composed of electrically conductive materials having a higher melting point than the refractory material, sintering the refractory material at temperatures just below its melting point by inductive heating of the assembly in an inert atmosphere, cooling the capsule and material, and recovering the refractory article.

More particularly, a high density hafnium carbide article may be formed by the method of the invention by placing the preformed hafnium carbide article into an electrically conductive capsule composed of tantalum carbide or a combination of tantalum carbide and hafnium carbide and then sintering the article at a temperature of approximately 3800° C. which is generated by inductively self-heating the assembly.

By encapsulating the refractory carbide article, important advantages are accomplished. The difficulties associated with the "skin effect" which have been hereinbefore referred to are eliminated. This is so because the article is positioned in the center of the assembly and is there subjected to a more uniform heat distribution. The periphery of the article is therefore not exposed to the "skin effect" phenomenon as is the periphery of the capsule. In addition, the encapsulating step permits a higher density article to be produced. This result is due to the fact that the capsule may be composed of materials which are selected so as to provide an electrical resistivity which is proper for an optimum frequency coupling factor in the inductive energy field, while the refractory article materials may be selected for the purpose of achieving the highest density. In this manner, the materials for the capsule and the refractory article are individually selected so as to enable a high density, high quality product to be produced.

The capsule which is employed in the method of the invention may be fabricated in any of a number of suitable configurations. The size and shape of the capsule will depend primarily upon the size and shape of the particular refractory article which is to be subjected to the method of the invention. A suitable capsule configuration may best be described by referring to the drawing.

In the drawing, a capsule comprises two half sections 10 and 12. Each half section is provided with a cavity 14 and 16 respectively. The half section 10 has a smooth, inwardly extending shoulder area 18 which is located between the cavity 14 and the outer surface 20. Similarly, the half section 12 has a smooth inwardly extending shoulder area 22 located between the cavity 16 and the outer surface 24. The cavities 14 and 16 each terminate (such as at 30, for example) within the half sections 10 and 12 so that the end face areas (designated by the numerals 26 and 28 respectively, but not actually shown) have no openings therein. A refractory carbide article 32 is positioned within the half section 10 and rests on the bottom 30 of the cavity 14.

In operation, the half section 12 is placed over the half section 10 so that the two inwardly extending shoulder areas 18 and 22 are in full contact. The cavity 16 accepts the protruding portion of the refractory article 32 and the cavities 14 and 16 together define a chamber in which the article 32 resides. The capsule and refractory article contained therein are then subjected to high sintering temperatures.

The capsule illustrated in the drawing is typical of a capsule which is formed prior to its use in the subject invention. It has been determined that this type of capsule facilitates recovery of the carbide article. Other suitable capsules may be fabricated by cold pressing a proper mixture around the preformed refractory article. This procedure requires additional steps such as presintering the carbide article. However, either type of capsule when employed in the method of the invention produces effective results.

The following examples further illustrate the method of the invention.

Example 1

0.35 gram of hafnium carbide were formed into a 3/16 inch diameter cylinder which was 3/16 of an inch in height. The cylinder was then pre-sintered by conventional means at a temperature of about 3000° C. to fix its shape. The pre-sintered hafnium carbide article was then totally encapsulated in a cylindrical shell composed of a mixture of tantalum, hafnium hydride and carbon, by cold pressing the mixture around the preformed hafnium carbide article. The relative amounts of the shell ingredients were regulated so that upon subsequent heating at approximately 1500° C. the final composition of the encapsulating shell was about 75% HfC and 25% TaC. The encapsulated assembly was then placed into a radio frequency induction heating apparatus and subjected to a frequency of 460 kilocycles per second. As the temperature of the assembly increased, the shell material was converted to a porous solid solution of TaC and HfC in the aforementioned proportions. During the heating operation, the entire assembly was protected from possible oxidation by enveloping it in an inert atmosphere composed of a mixture of argon and hydrogen. After heating to a temperature of about 3800° C. for approximately one minute, the specimen was cooled to room temperature and removed from the encapsulating shell.

Example 2

0.35 gram of hafnium carbide were formed into a 3/16 inch diameter cylinder 3/16 of an inch in height. The resulting plug of hafnium carbide was then placed into a cavity in a preformed capsule which was constructed of approximately 75% HfC and 25% TaC. The capsule was in the form of two identical half-shells which when placed together formed a chamber in the center thereof and housed the article to be inductively heated. The hafnium carbide article so positioned was heated in an inert atmosphere to a temperature of about 3800° C. for one minute. Upon cooling to room temperature, the hafnium carbide specimen was easily removed from the identical half-shell capsules.

The effectiveness of the subject invention is clearly determined by a comparison of the density of articles produced in accordance with the produced by conventional means. Normally, a maximum average density achieved by prior art techniques is in the range of 8.2 to 10.0 grams per centimeter (which is 65 to 80% of theoretical density). A typical sample processed with the method of the invention had a density of approximately 12.0 grams per centimeter (which is about 95% of theoretical density) and, in addition, exhibited a higher hardness.

It will be appreciated from the foregoing remarks, that the method of the invention provides a refractory carbide material with a high density and hardness. The article produced is useful for cutting, grinding and polishing applications as well as for use in devices which must withstand severe abrasion.

What is claimed is:

1. A method for providing a high density refractory carbide article comprising preforming said refractory carbide article to a desired shape, encapsulating said article in a capsule of electrically conductive material having a higher melting point than said article, said material being selected from the group consisting of tantalum carbide or a mixture of about 75% by weight of hafnium carbide and about 25% by weight tantalum carbide, sintering said article and said capsule for an effective time at a temperature just below the melting point of said article in an inert atmosphere, said sintering being accomplished by an inductive heating means, cooling said capsule and said article, and recovering said article from said capsule.

2. The method of claim 1 wherein said capsule comprises two preformed half sections, each half section having a cavity therein, said half sections being positioned such that said cavities form a chamber within said capsule for housing said refractory carbide article.

3. A method for providing a high density hafnium carbide article comprising preforming said hafnium carbide article to a desired shape, encapsulating said hafnium carbide article in a capsule of electrically conductive material having a higher melting point than said hafnium carbide article, said material being selected from the group consisting of tantalum carbide or a mixture of about 75% by weight of hafnium carbide and about 25% by weight tantalum carbide sintering said article and said capsule for an effective time at a temperature just below the melting point of said article in an inert atmosphere, said sintering being accomplished by inductive heating means, cooling said capsule and said hafnium carbide article, and recovering said article from said capsule.

4. The method of claim 3 wherein said inductive heating means functioned at a frequency of 460 kilocycles per second.

5. A method for providing a high density refractory carbide article comprising preforming said refractory carbide article, presintering said article at a suitable temperature to fix its shape, encapsulating said article by cold pressing a composition of tantalum, hafnium hydride and carbon around said article into the form of a capsule, sintering said article and said capsule for an effective time in an inert atmosphere at a temperature just below the melting point of said article, said capsule during sintering being composed of about 75% by weight of hafnium carbide and about 25% by weight of tantalum carbide, said sintering being accomplished by inductive heating means, cooling said capsule and said article, and recovering said article from said capsule.

6. The method of claim 5 wherein said refractory carbide article is composed of hafnium carbide.

7. The method of claim 6 wherein said inductive heating means functioned at a frequency of 460 kilocycles per second.

8. The method of claim 3 wherein said temperature is about 3800° C. and is maintained for approximately one minute.

9. The method of claim 7 wherein said temperature is about 3800° C. and is maintained for approximately one minute.

References Cited

UNITED STATES PATENTS

| 1,444,162 | 2/1923 | Beecher et al. | 264—65 |
| 2,964,400 | 12/1960 | Brennan | 264—56 |

ROBERT F. WHITE, *Primary Examiner.*

J. A. FINLAYSON, *Assistant Examiner.*